United States Patent [19]

Mulas et al.

[11] Patent Number: 4,476,891
[45] Date of Patent: Oct. 16, 1984

[54] MULTI-COMPONENT VALVE

[76] Inventors: Piero Mulas, Via Dodecaneso 50/6; Giancarlo Bonissone, Piazza Paola Da Novi 7/77, both of Genoa, Italy

[21] Appl. No.: 351,358

[22] Filed: Feb. 23, 1982

[30] Foreign Application Priority Data

Mar. 20, 1981 [IT] Italy .............................. 12475 A/81

[51] Int. Cl.³ .............................................. F16K 5/06
[52] U.S. Cl. ..................................... 137/270; 251/315
[58] Field of Search ................. 137/269, 270; 251/315

[56] References Cited

U.S. PATENT DOCUMENTS

| | | | |
|---|---|---|---|
| 670,083 | 3/1901 | Osborne | 137/270 |
| 741,267 | 10/1903 | Neubling | 137/270 |
| 3,943,962 | 3/1976 | Nagy | 137/270 |

Primary Examiner—Alan Cohan

[57] ABSTRACT

The invention relates to a valve which can be assembled in two directions at right angles. It has a valve body (20), two sleeves (21 and 22) for connection to two pipes, an obturator (10) and a spindle (11) for controlling the same.

According to the invention the valve body (20) is divided in two halves (31 and 32) by a plane inclined at 45° to the axis of the spindle (11) such that said two halves can be assembled either with the axes of the sleeves (21, 22) aligned or with the axes of such sleeves orientated at 90° with respect to each other.

5 Claims, 5 Drawing Figures

MULTI-COMPONENT VALVE

BACKGROUND OF THE INVENTION

The present invention relates to a multi-component valve having a valve body with an internal chamber or cavity containing an obturator and two seats for sealing against the obturator, two ducts, at least one of which is controlled by movement of the obturator, leading from the chamber.

There are known multi-component valves which can be taken apart and re-assembled for changing the seals; such valves can be configured for insertion in a straight pipe and can be configured for insertion in an elbow pipe, but in each case such a valve body cannot be used in both configurations.

It has been appreciated that it is desirable to provide a multi-component valve which can be assembled in two different configurations, for insertion either between two aligned conduits or between two conduits forming a 90° elbow. The present invention is thus intended to provide a multi-component valve which can be assembled in two different configurations in which the axes of one conduit connected to the valve are in respective directions at right angles to each other. A valve of this type allows one to halve the pieces to be stored, with clear economic advantages.

THE INVENTION

The invention provides a multi-component valve as set forth in claim 1. The remaining claims set forth preferred features of the invention.

EMBODIMENT OF THE INVENTION

An embodiment of the invention is now described, by way of example, with reference to the accompanying drawings, in which.

Figure 1:
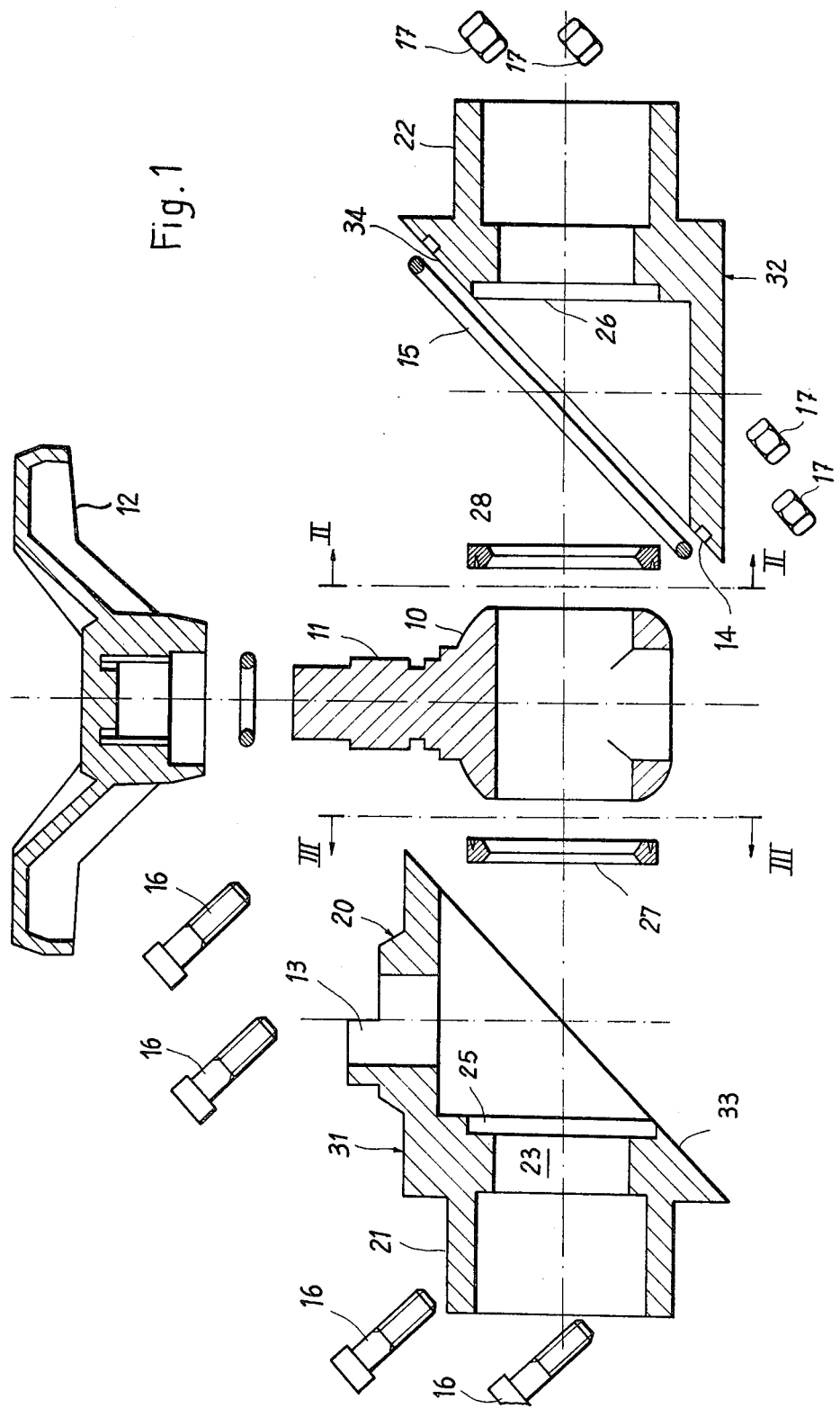
FIG. 1 is an exploded section through a valve of the invention, in the configuration used when the two conduits meeting at the valve have aligned axes.

The valve illustrated is a two position, two-connection cock or tap with a spherical obturator, by which is meant an obturator or rotary valve element 10 with part-spherical obturating surfaces. The obturator 10 has a spindle 11 which passes through the upper part and extends out of the valve body (as shown in the Figures) of the valve body 20.

A handle 12 can be mounted on the end of the spindle 11 in a way known per se.

The valve body 20, in the configuration shown in FIGS. 1 to 4, is substantially cylindrical; two nipple portions or sleeves 21 and 22 project from its ends, for connection in any suitable manner to the ends of two conduits (not shown). At their inner ends, the two sleeves 21, 22 have narrower bore parts 23, 24; annular grooves or seats 25, 26 are formed on the internal faces of the narrower bore parts 23, 24 for seals 27, 28 (see FIG. 1).

The valve body 20 has an internal, substantially cylindrical cavity or chamber 29 between the narrower bore parts 23, 24.

If the valve body 20 described up to this point were made in a single piece (apart from constructional arrangements permitting the insertion or the substitution of the obturator and the respective seals), the valve would not differ from a spherical obturator valve of the traditional type.

However, according to the invention, the valve body 20 is split into two valve body sections or main components 31 and 32 joined along a plane which makes an angle of 45° with the axis of rotation the obturator 10 and with the axis of the sleeves 21 and 22. The contact surfaces 33 and 34 along which the valve body sections abut are of rectangular shape, and the substantially cylindrical chamber cuts into the contact surfaces 33, 34 elliptical apertures 35, 36 which, in the views of FIGS. 2 and 3 (each of which forms an angle of 45° with the plane just described) appear in the shape of circles an arc of which has been replaced by a chord 37, 38.

The main component 31 differs from the main component 32 by the presence of the opening for the obturator spindle 11 the extend through.

Figure 2:
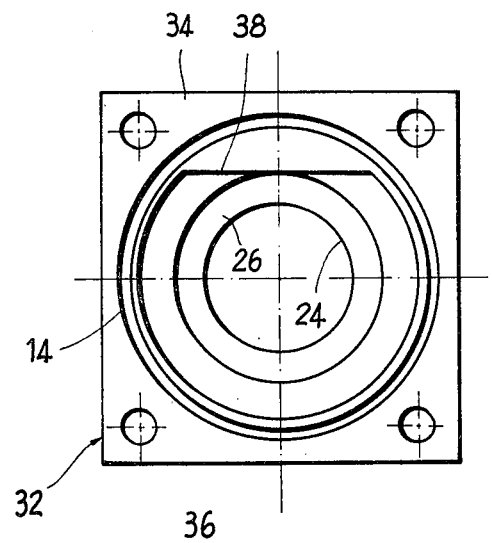
FIG. 2 is a view along the plane II—II of FIG. 1.
Figure 3:
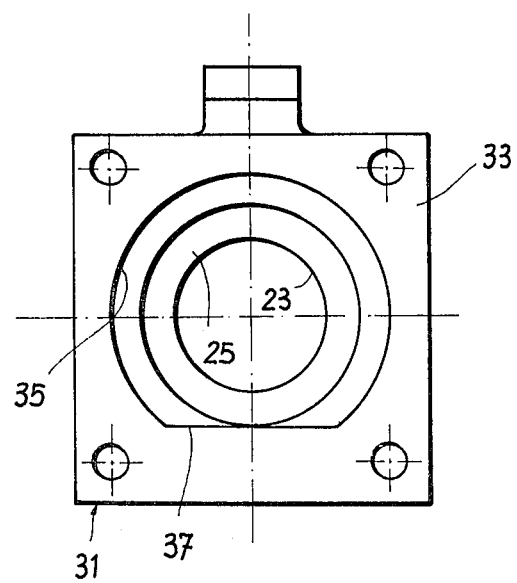
FIG. 3 is a view along the plane III—III of FIG. 1.

In addition, the element 32 has on its contact surface 34 al elliptical groove 14 for a seal 15; in FIG. 2, the elliptical groove 14 has the appearance of a circular groove because of the effect of the FIG. 2 view.

The component elements 31 and 32 are fixed together by four small bolts 16 associated with corresponding nuts 17 and are separable.

Figure 5:
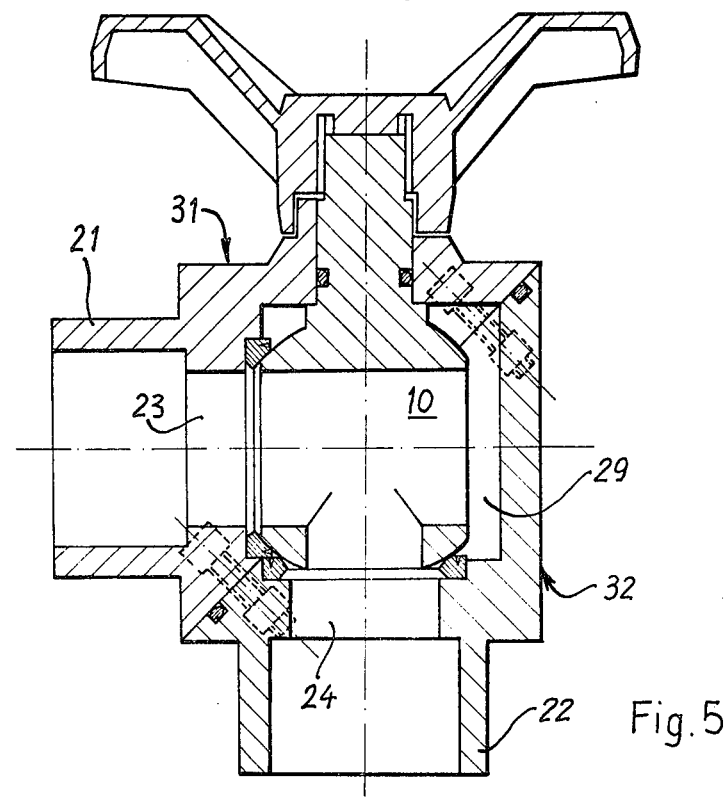
FIG. 5 is a section analogous to that of FIG. 4, in which however the two main components of the valve body are assembled in the configuration used when the conduits meeting at the valve have their axes at 90°.

As can be seen from FIGS. 1 and 5, if the component 32 is rotated through 180° about the axis of the sleeve 22 and then clockwise through 90° about the axis perpendicular both to the axis of the obturator 10 and to the axis of the sleeve 21, the second component 32 assumes the position illustrated in FIG. 5 in which the axes of the sleeves 21 and 22 are at 90°.

Figure 4:
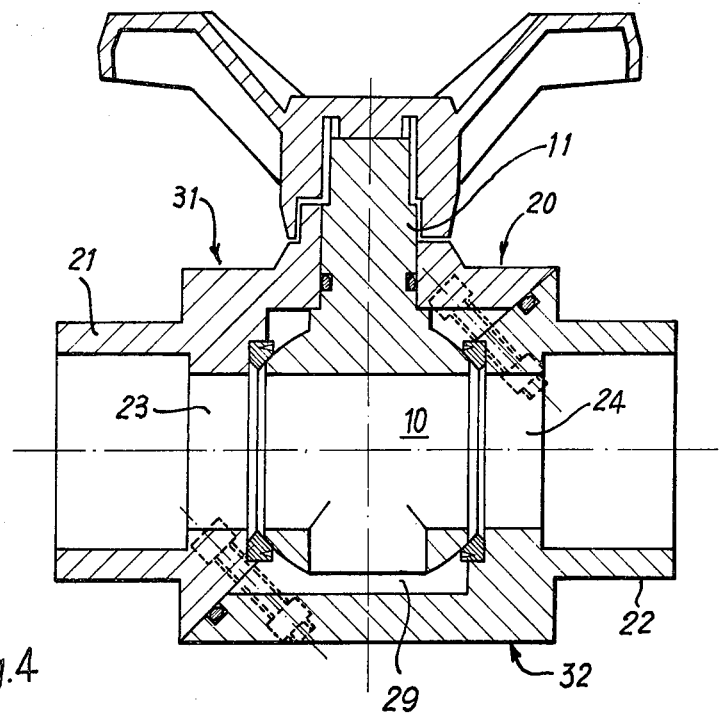
FIG. 4 is a normal section, corresponding to that of FIG. 1.

As can be seen in FIG. 5, it is still possible to use the same components as for the configuration illustrated in FIG. 4, which causes a notable saving in the expense of producing and storing the components of valves suitable for two different purposes and which, when assembled, have the configurations of two different valves.

Many modifications and variants can be made to the embodiment described above.

We claim:

1. A convertible valve comprising, a valve body having two interconnectable body sections assemblable together into a valve body, each body section having a cavity for jointly defining in an assembled condition of the two valve sections an inner cavity for housing a rotary valve element therein, each body section having a nipple portion having a bore therethrough for passage of fluid from one nipple portion to the other through the valve and for connection to conduits, a rotary valve element housable in said cavity and having an open-ended first bore passing at an angle through an axis of rotation of the valve element, the rotary valve element having an open-ended second bore having an end open to said first bore, the rotary valve element having an operating spindle extending therefrom, one of said body sections having an opening into the cavity thereof for receiving said spindle extending therethrough outwardly of the assembled valve body for selective actuation of the rotary valve element about the axis of rotation thereof for opening and closing the valve, the valve sections having complementary surfaces for abutting each other in an assembled condition of the two valve body sections, at least a part of each of the complementary surfaces being disposed in a common plane passing at an angle through said axis of rotation of the rotary valve element, one of the body sections being positionable alternatively in positions with the nipple portion thereof aligned and in communication with said first or with said second bore of the rotary valve element, and means for connecting the two valve sections in an assembled condition in said positions and for disassembly thereof.

2. A convertible valve according to claim 1, in which each valve body section has an annular groove coaxial with the bore of the corresponding nipple for receiving an annular seal therein, an annular seal disposed in each said groove in the valve body sections assembled.

3. A convertible valve according to claim 1, in which the bore of each nipple portion is disposed aligned with the first bore in said rotary valve element.

4. A convertible valve according to claim 1, in which the valve body section free of the spindle has the bore of its nipple portion aligned with the first bore of the rotary valve element and said one body valve section is in a position in which the bore of the nipple portion thereof is aligned with the second bore of the rotary valve element.

5. A convertible valve according to claim 1, in which said two valve body sections are two halves joined along a plane at said abutting surfaces at said plane disposed at an angle of 45° to the axis of rotation of the rotary valve element.

* * * * *